(12) United States Patent
Decker et al.

(10) Patent No.: US 6,338,519 B2
(45) Date of Patent: Jan. 15, 2002

(54) MOTOR VEHICLE TAILGATE

(75) Inventors: Laurent Decker, Boulogne Billancourt; Dominique Delavalle, Marchon; Maëlig Pommeret, Oyonnax, all of (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/726,053

(22) Filed: Nov. 30, 2000

(30) Foreign Application Priority Data

Dec. 15, 1999 (FR) .............................. 99 15846

(51) Int. Cl.⁷ .............................................. B62D 33/03
(52) U.S. Cl. ........................... 296/57.1; 296/50; 296/59
(58) Field of Search ............................ 296/50, 57.1, 59

(56) References Cited

U.S. PATENT DOCUMENTS

| | | | |
|---|---|---|---|
| 3,612,601 A | 10/1971 | Himka | 296/51 X |
| 3,749,440 A | 7/1973 | Lathers | 296/51 |
| 4,813,842 A * | 3/1989 | Morton | 296/57.1 X |
| 5,741,039 A * | 4/1998 | Habdas | 296/57.1 |
| 5,918,925 A * | 7/1999 | Perrin | 296/50 X |

FOREIGN PATENT DOCUMENTS

| | | |
|---|---|---|
| DE | 41 03 651 C 1 | 8/1992 |
| FR | 2 684 347 | 4/1993 |
| FR | 2 699 867 | 7/1994 |
| FR | 2 748 969 | 11/1997 |

* cited by examiner

Primary Examiner—Stephen T. Gordon
Assistant Examiner—Lori L. Coletta
(74) Attorney, Agent, or Firm—Oliff & Berridge, PLC

(57) ABSTRACT

The invention relates to a motor vehicle tailgate for mounting pivotally to a vehicle about hinges situated close to one of the edges of the tailgate. In the vicinity of its hinges, the tailgate is constituted by a main panel secured to the hinges and by a secondary panel which is movable relative to the main panel between a closed position in which it is superposed on the main panel so as to reconstitute a tailgate of full thickness, and an open position in which it is separate from the main panel, the main panel then forming a portion of the tailgate of reduced thickness.

9 Claims, 7 Drawing Sheets

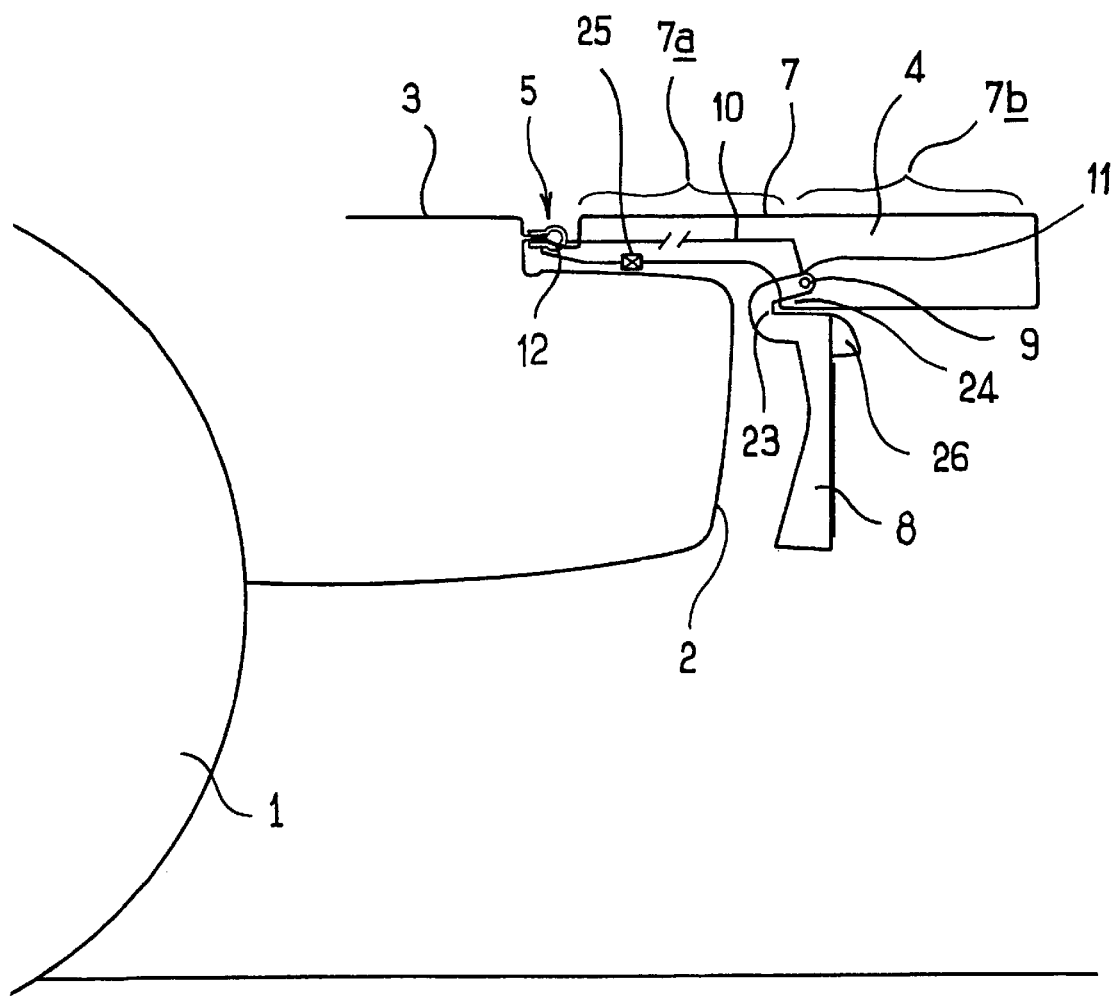

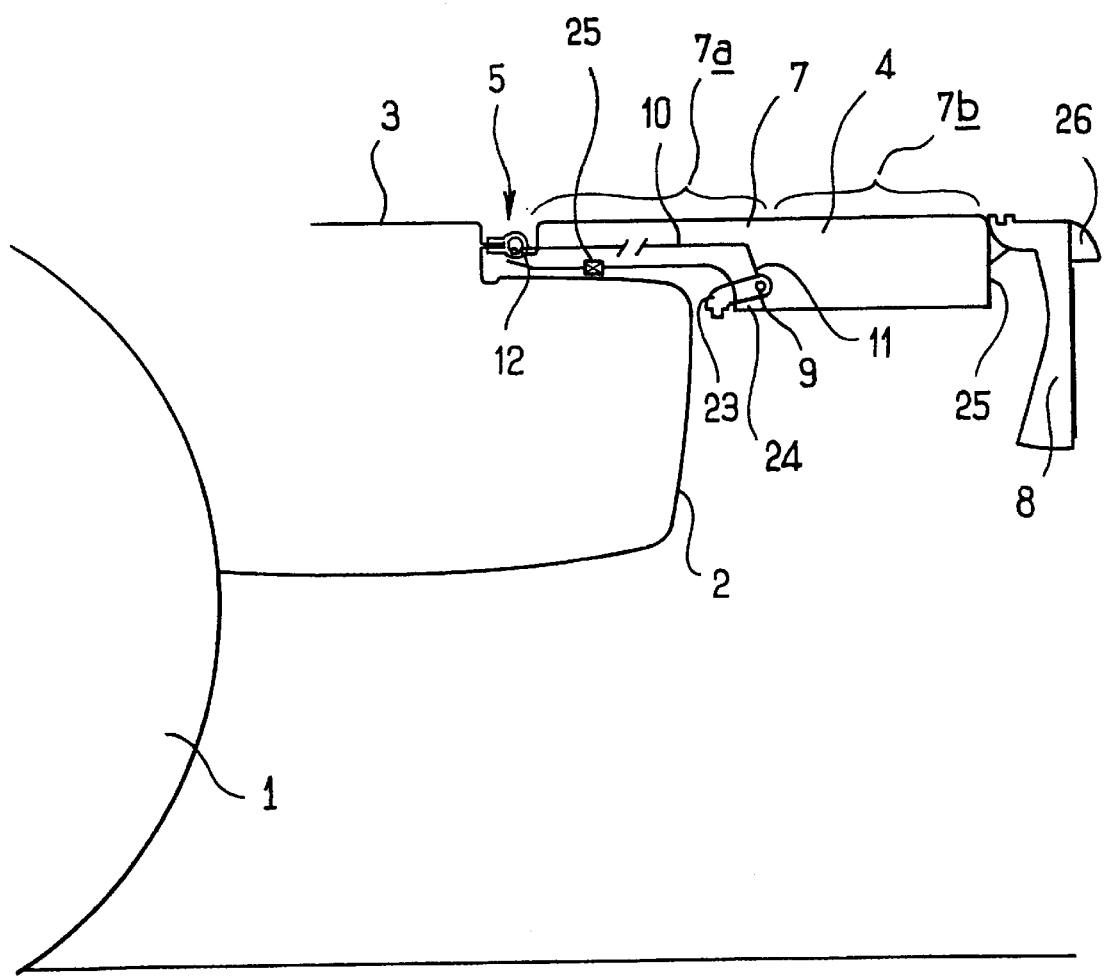

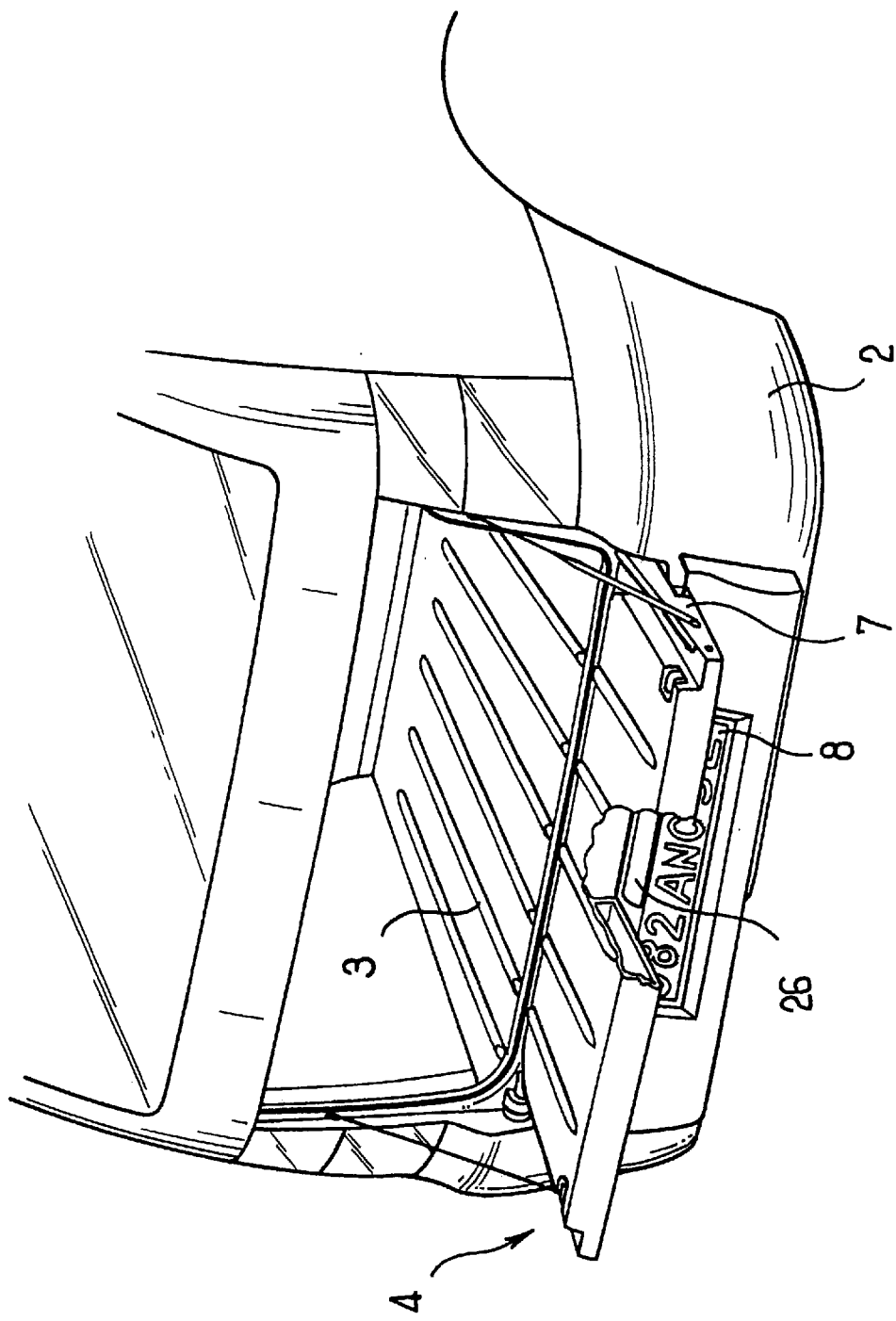
FIG_4

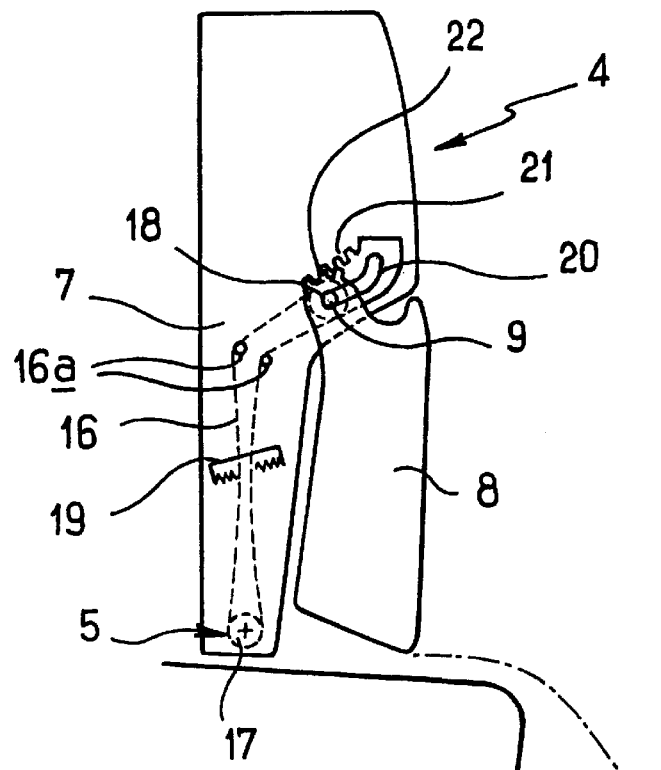
FIG_7a
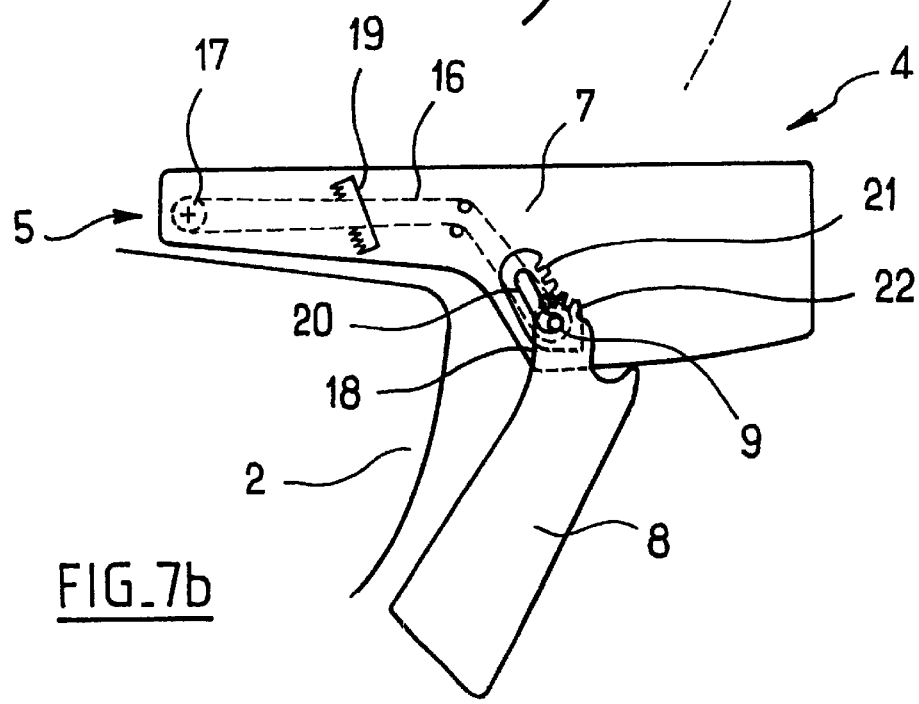
FIG_7b

MOTOR VEHICLE TAILGATE

The present invention relates to a motor vehicle tailgate, and more particularly to a tailgate for mounting on hinges situated along its bottom horizontal edge so as to pivot about said horizontal edge between a substantially vertical closed position and a substantially horizontal open position.

BACKGROUND OF THE INVENTION

In the open position, the tailgate extends the floor at the back of the vehicle to facilitate loading.

For such a tailgate to be able to pivot, it is necessary to leave an empty space enabling it to move angularly at the back of the vehicle.

In particular, unless the tailgate extends beyond the bumper at the back of the vehicle, it is necessary for the bumper to be positioned far enough below the closed tailgate to leave sufficient free height between the bumper and the floor at the back to accommodate substantially the thickness of the tailgate.

That constitutes a constraint on vehicle appearance that the present invention seeks to eliminate.

Furthermore, given that the bumper must not be positioned too low on account of its essential protective function, the floor at the back of the vehicle is often artificially raised so as to come up to the same level as the inside face of the tailgate when open, and that leads to a loss of volume at the back.

OBJECTS AND SUMMARY OF THE INVENTION

The present invention provides a motor vehicle tailgate designed to be pivotally mounted to a vehicle about hinges situated close to one of its edges, wherein, in the vicinity of its hinges, the tailgate is constituted by a main panel secured to the hinges and by a secondary panel which is movable relative to the main panel between a closed position in which it is superposed on the main panel so as to reconstitute a tailgate of full thickness, and an open position in which it is separated from the main panel, with the main panel then constituting a portion of the tailgate of reduced thickness.

This "thinner" portion of the tailgate enables the tailgate to be folded down while requiring smaller clearance than would be necessary if the tailgate retained its initial thickness on being opened.

The invention thus makes it possible to bring the floor at the back of the vehicle closer to the back bumper when the tailgate pivots about its bottom horizontal edge, since the minimum distance between the floor at the back of the vehicle and the bumper is the thickness of the main panel only and not the full thickness of the entire tailgate.

In a particular embodiment of the invention, the secondary panel is situated on the outside face of the tailgate.

In a particular embodiment, the secondary panel is mounted to pivot relative to the main panel about an axis which is situated, relative to the secondary panel, remote from the hinges of the tailgate.

In this embodiment, the secondary panel can extend perpendicularly to the tailgate in its open position.

Given that the open tailgate is generally horizontal, the panel that has pivoted to be perpendicular to the open tailgate is vertical.

The secondary panel can then be used to support a device carrying signaling lights and/or a license or number plate possibly with license plate lighting, thus enabling the vehicle to be used with its tailgate open and still comply with regulations.

In another embodiment, that the secondary panel can be detached from the main panel.

In an advantageous variant, the secondary panel when detached from the main panel can be fixed back on the tailgate at some other point.

For example, the secondary panel can be fixed perpendicularly to the tailgate at its point situated furthest back relative to the vehicle, so as to serve as a support for signaling lights or a license plate, while also marking the rear end of the vehicle as constituted by the end edge of the tailgate remote from its hinges.

The secondary panel fixed in this way at the rearmost point of the vehicle also serves as a bumper for low energy impacts, thereby protecting the edge of the tailgate remote from its hinges, which is particularly vulnerable if the vehicle is used with its tailgate open.

In a particular embodiment of the invention, a latching mechanism holds the secondary panel in its closed position against the main panel.

In an advantageous variant, the latching mechanism is coupled to the control of a lock for the tailgate so that the secondary panel passes from its closed position to its open position when the tailgate is opened.

In another embodiment, the tailgate includes a synchronization mechanism which tilts the secondary panel into its open position while the tailgate is pivoting into its open position, and vice versa.

Advantageously, the secondary panel constitutes a "fuse" zone of the tailgate.

BRIEF DESCRIPTION OF THE DRAWINGS

In order to make the invention better understood, there follows a description given by way of non-limiting example and with reference to the accompanying drawings, in which:

FIG. 2 is a view analogous to FIG. 1 after the tailgate has been folded down;

FIG. 3 is a view analogous to FIG. 2 showing a variant secondary panel;

FIG. 4 is a three-quarter rear perspective view of the vehicle;

FIGS. 7a and 7b are views analogous to FIGS. 5a and 5b for another control mechanism.

MORE DETAILED DESCRIPTION

Figure 1:
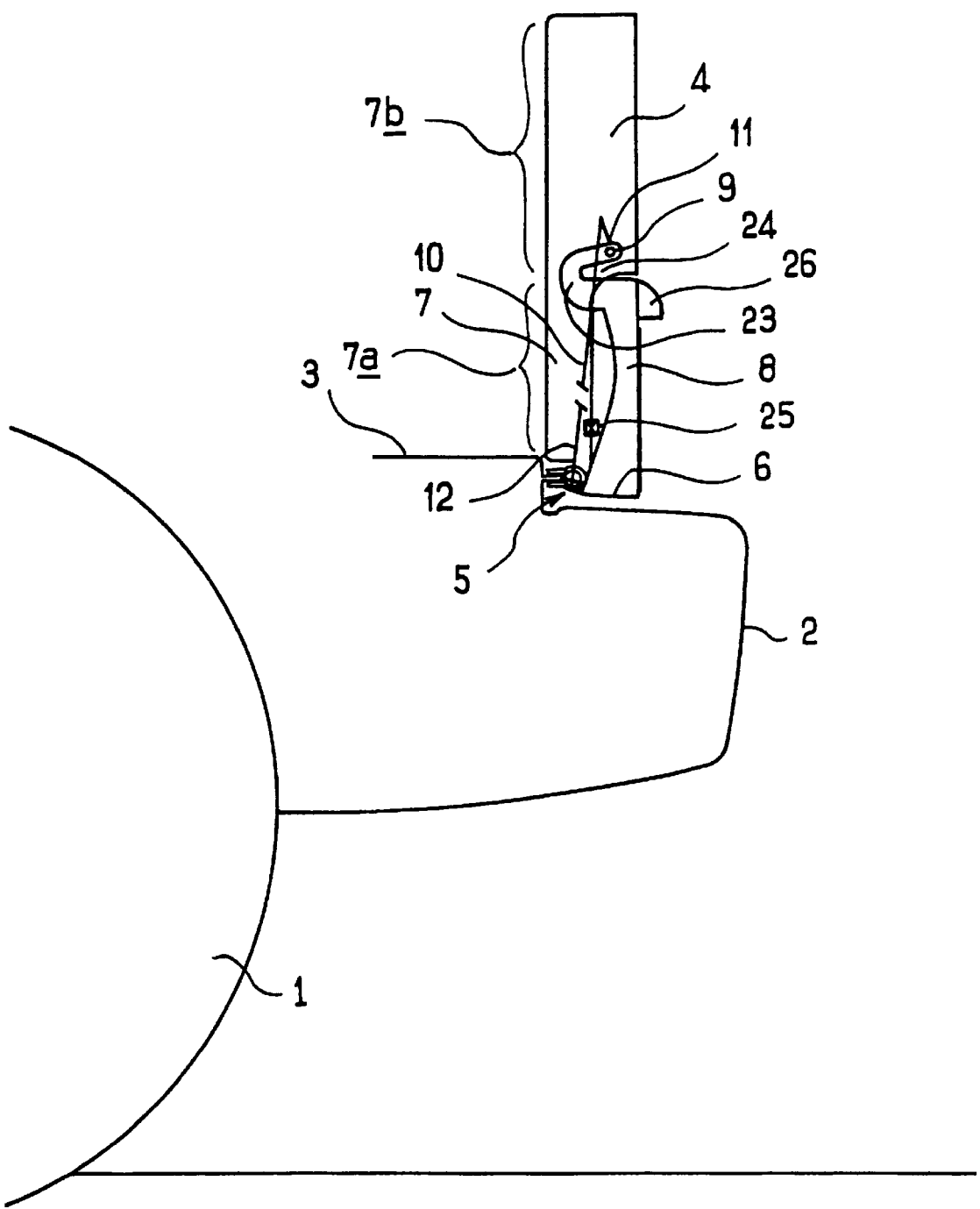
FIG. 1 is a longitudinal section on a vertical plane through the rear end of a vehicle.

FIGS. 1, 2, and 3 show the rear left wheel 1 of a vehicle and also its rear bumper 2 and the floor 3 at the back of the vehicle, e.g. in its luggage compartment.

The back of the vehicle is closed by a tailgate 4 mounted to pivot on the vehicle about hinges 5 situated along the bottom horizontal edge 6 of the tailgate.

The tailgate 4 is shown diagrammatically in FIGS. 1 to 3. Its outside shape is shown in greater detail in FIG. 4.

The tailgate is constituted by an inside panel 7 which, in the terminology of this specification, constitutes the "main" panel of the tailgate.

This inside panel 7 extends over the entire surface area of the tailgate from its hinges to its top horizontal edge remote from the hinges. It forms the entire inside face of the tailgate.

The main panel 7 has a portion 7a close to the hinges that is of reduced thickness and an additional portion 7b remote from the hinges of thickness that corresponds to the total thickness of the tailgate. In this second portion, the tailgate 4 is constituted by this main panel 7 on its own.

In the first portion 7a of smaller thickness, the main panel constitutes only half of the tailgate, and the other half is formed by a secondary panel 8 which occupies the recess left empty in the main panel because of the smaller thickness of its portion 7a adjacent to the hinges compared with its portion 7b remote from the hinges.

The secondary panel 8 is mounted to pivot on the main panel 7 about an axis 9 that is parallel to the axis defined by the hinges 5.

As can be seen in FIG. 2, when the tailgate 4 is in the open position, the secondary panel 8 has pivoted into an open position in which it extends perpendicularly to the tailgate, i.e. vertically.

This pivoting of the secondary panel 8 moves it away from the main panel 7 so that in the vicinity of its hinges 5 the tailgate is of reduced thickness corresponding to the thickness of the main panel 7 alone, and the empty space thus released enables the tailgate to move angularly without touching the bumper 2 which is at a level below the hinges 5.

This makes it possible to position the bumper in quite a high position at the back of the vehicle. Conversely, for a given height of bumper, it is possible to lower the floor at the back of the vehicle while keeping the inside face of the tailgate in its open position at the same height, thus increasing the space available in the back of the vehicle.

The secondary panel 8 is connected to the hinges 5 of the tailgate 4 by a synchronizing or control mechanism which applies torque to the secondary panel so as to keep it in a vertical position while the tailgate is passing from its closed vertical position to its open horizontal position.

Figure 5A:
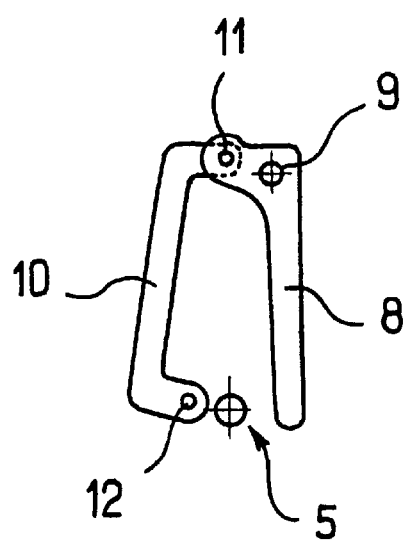
FIGS. 5a and 5b are diagrammatic views on a larger scale of a mechanism for controlling the secondary panel when opening the tailgate, before and after pivoting of the tailgate.
Figure 5B:
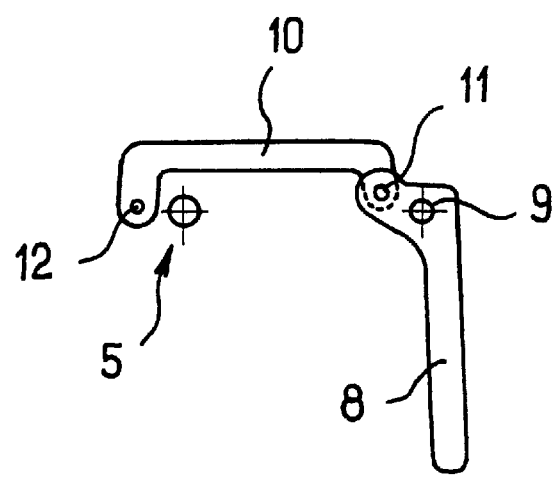

As can be seen in FIG. 5a, this synchronization mechanism can be constituted by a link 10 which, on the deformable parallelogram principle, keeps a point 11 of the secondary panel at a distance from its axis that is equal to the distance of a point 12 from the hinge remote from its axis.

Figure 8:
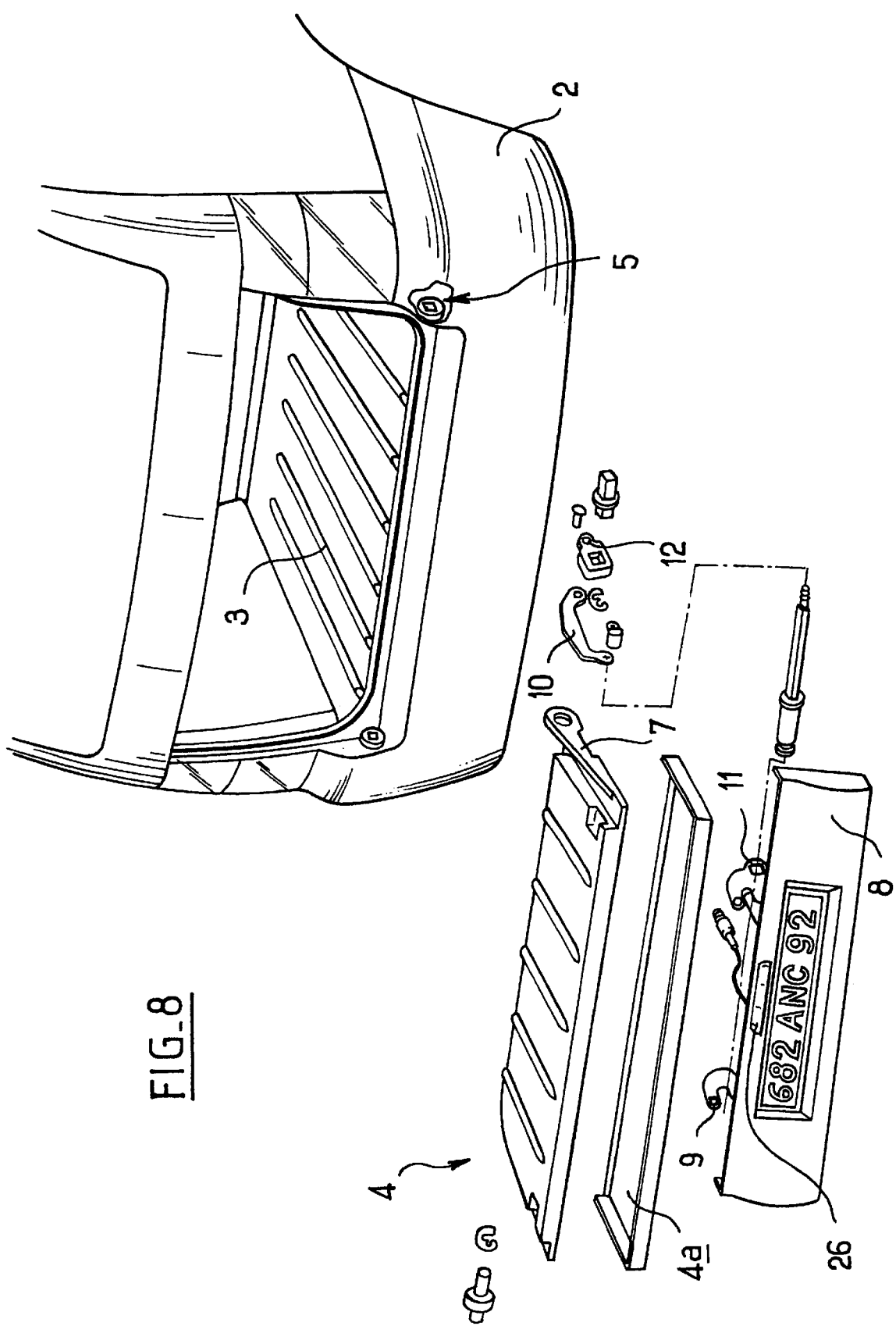
FIG. 8 is an exploded view of the rear of the vehicle using the control mechanism of FIG. 5.

The various parts of this mechanism can also be seen in FIG. 8 which also shows the outside panel 4a of the tailgate.

In a variant (not shown), the synchronization mechanism can be constituted by an unlocking system that releases the secondary panel which, under drive from a spring, immediately takes up its open position after the tailgate has begun to pivot.

Figure 6A:
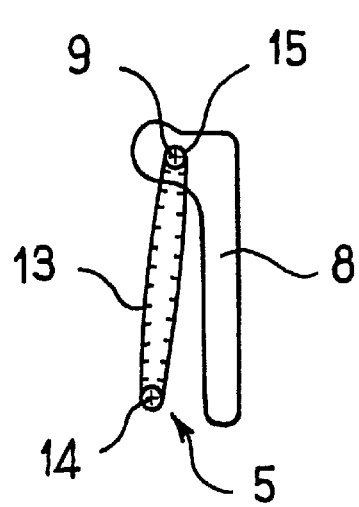
FIGS. 6a and 6b are views analogous to FIGS. 5a and 5b for another control mechanism.

In the variant of FIG. 6a, the synchronization mechanism has a cog belt 13 connecting a fixed cog wheel 14 that is secured to the vehicle in the vicinity of the hinges but that does not pivot with the tailgate, to a cog wheel 15 situated on the axis 9 of the secondary panel and secured to said secondary panel.

It will be understood that when the tailgate pivots, the cog belt 13 prevents the cog wheel 15 from changing its orientation so the secondary panel remains vertical.

Figure 6B:
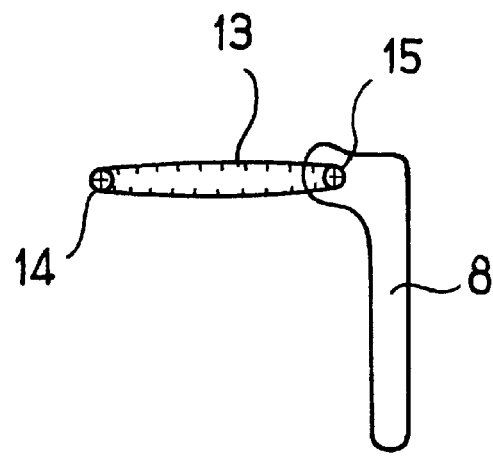

It therefore takes up the position shown in FIG. 6b when the tailgate has reached its open position.

In the variant of FIGS. 7a and 7b, there is a belt 16 connecting a fixed wheel 17 secured to the vehicle in the vicinity of the hinges to a wheel 18 secured to the secondary panel via deflectors 16a which keep the belt inside the main panel 7.

As explained above, the belt 16 keeps the secondary panel in its initial vertical orientation.

Belt tensioners 19 are housed on either side thereof so as to enable it to accommodate an increase in the distance between the two wheels 17 and 18.

The shaft on the axis 9 of the secondary panel (corresponding to the wheel 18 in the figure) is mounted on the main panel 7 in a slot 20 in which said shaft can move.

One of the longitudinal edges of the slot 20 forms a rack 21 while the wheel 18 secured to the secondary panel has a toothed sector 22 which meshes with said rack.

The synchronization mechanism operates as follows.

When the tailgate moves into its open position, it pivots about its hinges 5.

Because of the presence of the belt 16, the secondary panel remains vertical, as in the variant of FIG. 6, thus moving it away from the main panel.

Simultaneously, the toothed sector 22 which retains its initial orientation pivots relative to the rack 21 which turns with the tailgate.

As a result, the shaft of the panel on the axis 9 moves along the slot 20 under drive from the rack.

The shape of the slot 20 (oblique when the tailgate is closed, as can be seen in FIG. 7a) has the effect of moving the shaft away from the hinges 5.

This has the effect of raising the secondary panel relative to the tailgate at the beginning of pivoting, thus compensating for the downward movement of the tailgate due to it being opened.

The travel followed by the lowest point of the secondary panel is shown in dashed lines in FIG. 7a.

It can be seen that the secondary panel can remain at a substantially constant height during an initial stage of the tailgate pivoting, until it has gone beyond the rear end of the bumper, after which it can move down beyond the bumper, as shown in FIG. 7b.

This variant of the synchronization mechanism thus makes it possible to maintain a relatively high bumper that projects rearwards relative to the tailgate.

By choosing a suitable shape for the slot 20, it would even be possible to cause the secondary panel to rise when the tailgate begins to pivot, thus enabling it to get round a bumper that is raised, e.g. as a spoiler.

It can be seen, in particular in FIG. 2, that the secondary panel is connected to its hinge axis on the main panel via U-shaped arms 23 which serve to go round a visor 24 masking the hinge axis 9 of the secondary panel when the tailgate is in its closed position.

As shown in FIGS. 1 and 2, a latch 25 can hold the secondary panel 8 against the main panel 7 in the closed position so as to relieve the synchronization mechanism which comes into operation only when the tailgate pivots, without being called on to hold the two panels against each other when the tailgate is closed.

On passing into the open position, the latch 25 opens when the tailgate begins to pivot, e.g. as a result of unlocking the tailgate.

In the variant shown in FIG. 3, the secondary panel 8 can be separated from its U-shaped arms 23 so as to enable it to be fixed to the rear end of the tailgate in the open position, i.e. to its edge 25 which is remote from its hinges, thus marking the rear end of the vehicle.

In this way, the vehicle can be used with its tailgate open in order to transport long objects.

The secondary panel 8 can carry the vehicle license plate, and also a light 26 for lighting the license plate.

When the secondary panel 8 is fixed at the rear end of the tailgate, the fixing preferably lies at the highest point of the tailgate so as to increase the ground clearance at the back of the vehicle.

It should be observed that the tailgate of the invention performs its conventional function of closing the back of the vehicle properly because in the closed position it presents thickness that is constant and corresponds to the normal thickness of a tailgate.

In addition, the secondary panel constitutes a "fuse" zone for the tailgate which, in the event of a minor impact, can be the only portion that is damaged, and thus the only portion that needs to be replaced, and that is economically advantageous.

What is claimed is:

1. A motor vehicle tailgate designed to be pivotally mounted to a vehicle about hinges situated close to one of its edges, wherein, in the vicinity of its hinges, the tailgate is constituted by a main panel and a secondary panel, the secondary panel is movable relative to the main panel between a closed position in which the secondary panel is superposed on the main panel so as to reconstitute a tailgate of full thickness, and an open position in which the secondary panel is separated from the main panel, with the main panel then constituting a portion of the tailgate of reduced thickness, the secondary panel is situated on an outside face of the tailgate when the tailgate is in a closed position.

2. A tailgate according to claim 1, wherein the secondary panel is mounted to pivot relative to the main panel about an axis which is situated, relative to the secondary panel, remote from the hinges of the tailgate.

3. A tailgate according to claim 1, wherein the secondary panel can extend perpendicularly to the tailgate in its open position.

4. A tailgate according to claim 1, wherein the secondary panel can be detached from the main panel.

5. A tailgate according to claim 4, wherein the secondary panel when detached from the main panel can be fixed back on the tailgate at some other point.

6. A tailgate according to claim 1, wherein a latching mechanism holds the secondary panel in its closed position against the main panel.

7. A tailgate according to claim 6, wherein the latching mechanism is coupled to a lock for the tailgate so that the secondary panel passes from its closed position to its open position when the tailgate is opened.

8. A tailgate according to claim 1, including a synchronization mechanism which tilts the secondary panel into its open position while the tailgate is pivoting into its open position, and vice versa.

9. A tailgate according to claim 1, wherein the secondary panel constitutes a "fuse" zone of the tailgate.

* * * * *